tates Patent Office 3,740,195
Patented June 19, 1973

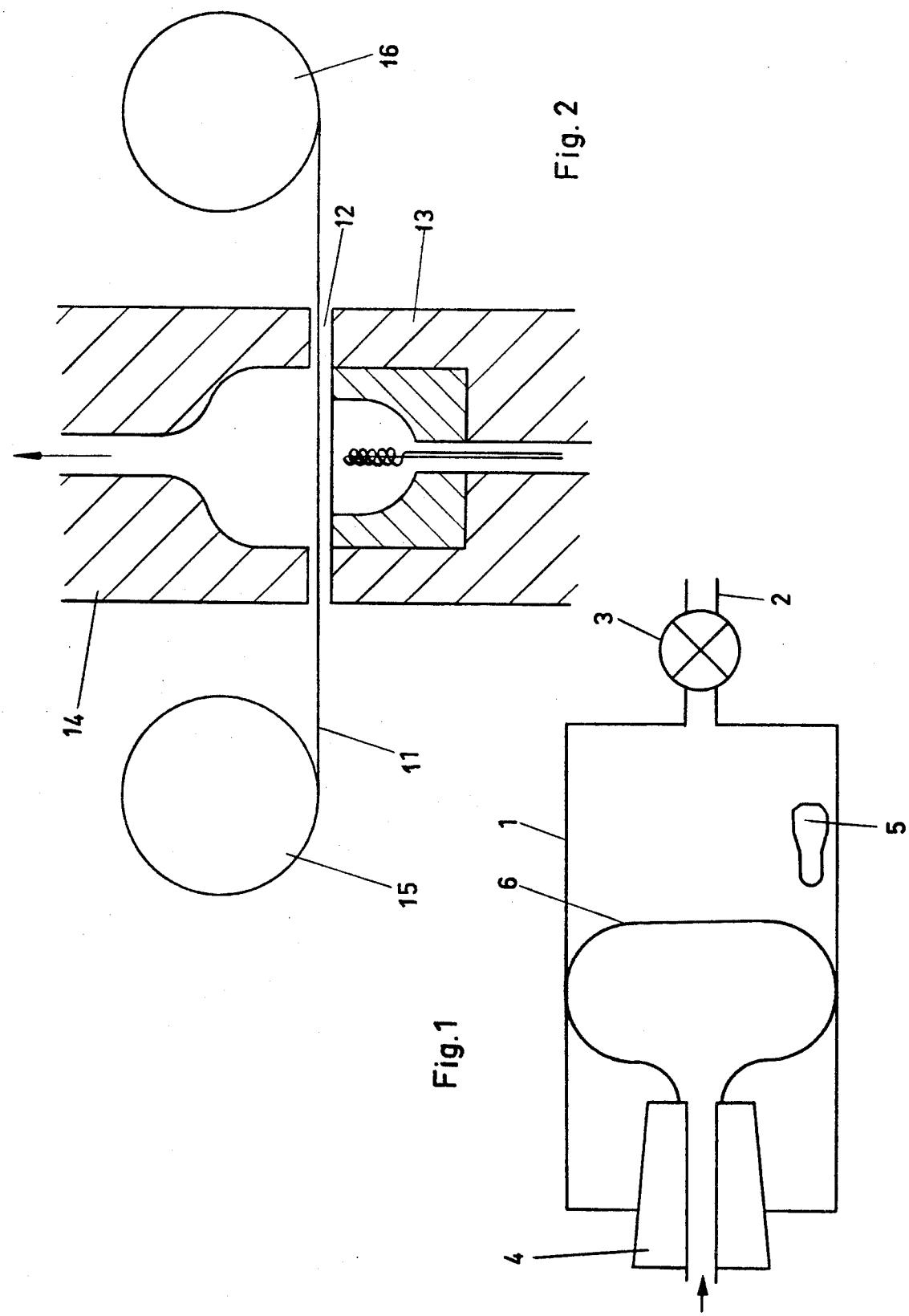

3,740,195
PROCESS AND DEVICE FOR MAKING STANDARD ANALYSIS GAS
Werner Lietzau, Heerstrasse 200,
Frankfurt am Main, Germany
Filed Jan. 13, 1971, Ser. No. 106,139
Claims priority, application Germany, Jan. 23, 1970,
P 20 02 933.8
Int. Cl. G01n 1/22
U.S. Cl. 23—232 R    5 Claims

ABSTRACT OF THE DISCLOSURE

Trace component is produced by decomposition of a predetermined amount of a salt and mixed with carrier gas for concentrations on order of parts per million and billion. Batches of standard gas mixtures are made by breaking an ampule containing salt pyrolysis products in carrier gas. Continuous process decomposes salt on a strip moving through atmosphere of carrier gas with continuous drawing off of mixture of carrier gas and trace component at zone of decomposition of salt.

BACKGROUND OF THE INVENTION

Gas analyzing instruments for the measurement of concentration components in trace amounts of vapors or gases must, of course, be highly sensitive, but good sensitivity alone does not insure that the instruments are always accurate. In general, in order to insure the highest degree of accuracy for an instrument, the instrument must be checked rather often and, when necessary, be recalibrated. For these operations it is necessary to have continuously on hand calibration and testing gases containing minute amounts of the trace component, or to be able to produce these gases quickly and conveniently.

The invention provides a process for the preparation of calibration and testing gases suitable for testing and calibrating gas analysis instruments wherein the tested or calibrating gases contain the substance analyzed for in the range of parts per million or parts per billion. The process can be carried out by simple equipment easily and conveniently handled by personnel having a relatively low degree of skill.

DESCRIPTION OF THE INVENTION

In the invention the concentration of the trace substance in the calibrating or testing gas is predetermined by the amount of a salt, which liberates or evolves the trace component in gaseous form for intermixing in the proper amount of carrier gas. For liberation of the trace component, it is advantageous to use a salt which evolves the trace substance under pyrolytic conditions. The predetermined amount of salt to be pyrolized can be sealed in an ampule, which, after pyrolysis, can be destroyed in a container filled with the carrier gas.

Another particular device for carrying out the invention is characterized by having a ribbon uniformly coated with the salt move at constant speed through a narrow space between a device for evolving the trace substance and a suction device, with carrier gas surrounding the space. An electric heater is preferably used for pyrolyzing the salt and liberating the trace substance.

By use of a salt that quantitatively evolves the required amount of the trace substance it is easy to determine the correct proportioning for very small concentration gradations, since the corresponding amounts of salt can easily be weighed out or deposited from salt solutions of corresponding strength.

DESCRIPTION OF THE DRAWINGS

FIGS. 1 and 2 show schematically two different devices for carrying out the invention.

The device of FIG. 1 includes a thick walled glass container 1 provided with a short tube or pipe 2 having a gas stop cock 3 for shutting off the interior of the container from the exterior. A stopper 4 having a bore therethrough can be inserted in the container through an opening therein. A glass ampule 5 in the container 1 contains, sealed in the ampule, the products from an appropriate amount of salt which have been subjected to pyrolysis for forming the desired amount of trace gaseous substance for carrier gas within the container 1. After pyrolysis of the salt, the ampule is broken or destroyed, as by shanking the container, and the liberated trace substance passes out with its carrier gas from the container 1 through the opened stop cock 3 and is conducted to the gas analysis instrument, or an element to be used with the instrument via the tube 2. Exit of the mixture of carrier gas and trace substance is aided by an inflatable bulk-like device 6 within the container 1 and having a conduit to the interior of the device passing through the bore of the stopper to admit an inflating fluid. The concentration of the trace substance is determined by the amount of carrier gas in the container and the amount of trace substance liberated by pyrolysis in the ampule, and the latter amount, in turn, depends on the amount of salt sealed in the ampule. The glass container 1 is filled with the provided carrier gas before the breaking open of the ampule.

A rather large injection syringe, of plastic for example, may be used instead of the container 1, especially if air is used as the carrier gas. The resulting standardizing gas, obtained as described of container 1, is driven out of the barrel of the syringe by pressing on the plunger of the syringe.

For gas analysis instruments depending on absorption of radiation, the above described process may be used to produce test or calibrating gas mixtures for filling cuvettes. These cuvettes may then be placed by hand, or by automatic devices, in the one or more paths of radiation provided for operation of the instrument. The invention may be used for producing comparison gas for two-beam analyzers.

In the form of the invention shown in FIG. 2, the trace component is produced by using a salt-coated metal ribbon 11 passed at a uniform speed through a gap or narrow space 12 between an electrical source of heat 13 and a suction device 14. The coated metal ribbon is unwound from a supply roll or spool 15 and, after passing through the gap 12 is wound on a take-up spool 16. The source of heat 13 and the suction device 14 are surrounded by carrier gas so that uniform action by the suction device draws carrier gas uniformly to the zone of the gap 12. This is done so that the amount of carrier gas drawn in thus mixes with the trace substance liberated from the salt coating by the heat source, and the resulting gas mixture is conveyed to the analysis instrument.

The coating of the ribbon, which may be of aluminum, for example, with a uniform coating of salt, can be produced by passing the ribbon through a salt solution of predetermined concentration. The absorption by the ribbon can be increased by pre-treatment. After the solvent of the solution is evaporated, either by low heat or simply allowing the ribbon to dry, a uniform coating of the salt remains on the ribbon.

If the component of interest in the test gas mixture is to be nitrogen dioxide produced by the process, lead nitrate, for example, is especially suitable for the salt subjected to pyrolysis. Carbon dioxide is easily obtainable from manganese carbonate, for example. The chemical compounds used must decompose quantitatively with respect to the trace component to be evolved so that an accurately fixed amount of the tract substance is obtained from a predetermined amount of the salt.

The process need not be limited to pyrolysis for the evolution of the trace substance. Other methods involving the use of electrolysis, catalysis, and the like may be used to set free a definite amount of the component of interest for provided trace amounts in calibration or test gases.

The invention claimed is:

1. A process for the production of a standard gas for use in gas analysis instruments and containing trace amounts of a component on the order of parts per million and parts per billion, comprising the steps of:

providing a carrier ribbon with a layer of a salt which may decompose and liberate the said component;

moving the ribbon with the salt layer through a narrow zone containing and receiving a carrier gas;

causing the salt when passing through the zone to decompose; and sucking the liberated trace component and carrier gas from the zone at a predetermined rate, the rate of suction and the rate of movement of the carrier being determined so that the liberated component gas and the carrier gas as sucked mix continuously to obtain the desired ratio of carrier gas and component gas.

2. A process as claimed in claim 1, said decomposing of the salt being effected by pyrolyzing the salt.

3. A process for the production of a standard gas for use in gas analysis instruments and containing trace amounts of a component on the order of parts per million and parts per billion, comprising the steps of:

placing a predetermined amount of a salt in a destructible ampul and sealing the ampul, the salt having characteristics of decomposing by pyrolysis thereby liberating the said component;

heating the salt in the ampul to effect the pyrolysis so that said component be liberated in the ampul; providing a predetermined amount of carrier gas of a container, the ratio of carrier gas in the container, to the amount of liberated component in the first container being very large; and breaking the ampul to release its content into the container, so that the content of the ampul and of the container mix to obtain said standard gas.

4. A device for producing standard gas containing a trace component comprising, a substantially inert strip carrying uniformly and fixed thereon a salt decomposable to liberate quantitatively the component, means to move the strip longitudinally through an atmosphere of carrier gas and at a pre-determined rate, decomposition means situated close to the path of the strip for decomposing the salt in a short lengthwise section of the strip during motion of the strip, and suction means situated near the decomposition means for drawing off a mixture of the component and the carrier gas.

5. A device as claimed in claim 4, said decomposition means being an electric heater for pyrolyzing the salt.

References Cited

UNITED STATES PATENTS

| | | | |
|---|---|---|---|
| 2,824,789 | 2/1958 | Borkenstein | 23—254 |
| 2,895,807 | 7/1959 | Sorg et al. | 23—232 X |

OTHER REFERENCES

O'Keeffe et al.: "Primary Standards for Trace Gas Analysis," Analytical Chemistry, vol. 38, No. 6, May 1996, p. 760.

Angely et al.: "General Method To Prepare Standard Samples for Detector Calibration in Gas Chromatographic Analysis of Gases," Analytical Chemistry, vol. 41, No. 11, September 1969, p. 1446.

MORRIS O. WOLK, Primary Examiner

R. E. SERWIN, Assistant Examiner

U.S. Cl. X.R.

23—230 PC, 253 PC, 253 TP, 254 R